United States Patent [19]

Shinn

[11] Patent Number: 4,695,831
[45] Date of Patent: Sep. 22, 1987

[54] LIGHT PEN HAVING ACTUATING ACCELEROMETER

[75] Inventor: Alan L. Shinn, Berkeley, Calif.

[73] Assignee: Humphrey Instruments, Inc., San Leandro, Calif.

[21] Appl. No.: 731,416

[22] Filed: May 6, 1985

[51] Int. Cl.⁴ .............................................. G09G 3/02
[52] U.S. Cl. ................................... 340/707; 340/706; 178/18
[58] Field of Search .............. 340/707, 708, 709, 710; 178/18

[56] References Cited

U.S. PATENT DOCUMENTS

| | | |
|---|---|---|
| 3,498,692 | 3/1970 | Jewitt et al. |
| 3,749,932 | 7/1973 | Jones |
| 3,758,782 | 9/1973 | Radford et al. |
| 3,801,741 | 4/1974 | Ablett |
| 4,224,666 | 9/1980 | Giraud |
| 4,263,592 | 4/1981 | Takahashi et al. |
| 4,367,465 | 1/1983 | Mati et al. ............................ 340/712 |
| 4,430,526 | 2/1984 | Brown et al. |
| 4,454,417 | 6/1984 | May |

FOREIGN PATENT DOCUMENTS 0203129 12/1982 Japan ................................... 340/707

OTHER PUBLICATIONS

"Light Pen" by M. S. Bilsback, in IBM Technical Disclosure Bulletin, vol. 15, No. 8, Jan. 73, pp. 2522, 2523.

Primary Examiner—Gerald L. Brigance
Assistant Examiner—Jeffery A. Brier
Attorney, Agent, or Firm—Townsend and Townsend

[57] ABSTRACT

A light pen of the type having a photoreceptor for sensing the signal from a CRT computer display and outputting to computer logic the location of the photosensing light pen is disclosed. The improvement herein is the incorporation of an accelerometer on the light pen actuated by tapping the pen gently on the screen. The accelerometer has the preferred form of a microphone acoustically deadened as by the placement of silicone rubber over the acoustical channel. The rubber acts as an accelerometer mass outputting a high frequency signal upon tapping of the light pen on the glass covering a CRT screen. A monostable amplifier opens a signal gate to conventional computer measuring logic for that duration necessary to assure one complete raster sweep of the screen. A light receptor at the screen end of the light pen outputs through a video amplifier and fast comparator to measure the precise moment of video raster passage. This light measurement is transmitted to conventional gate logic interior of the computer and compared to raster location, and converted into pen location.

3 Claims, 4 Drawing Figures

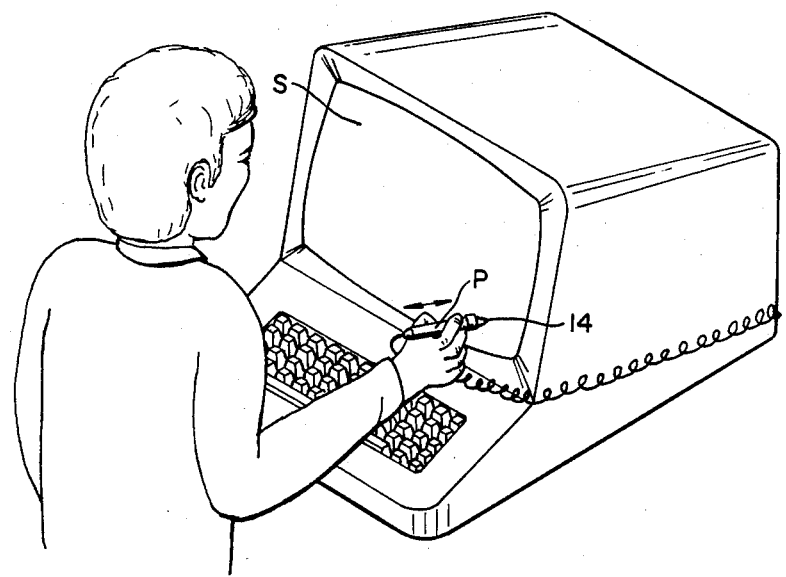
FIG._1.
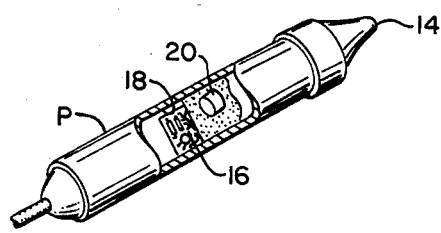
FIG._2.

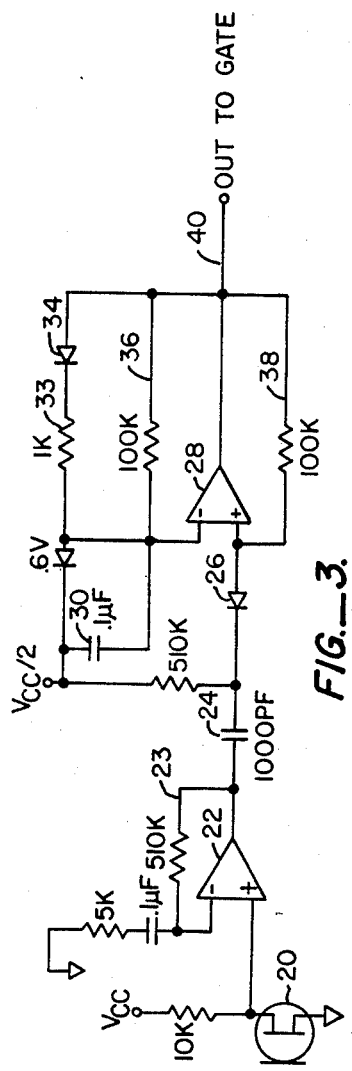
FIG._3.
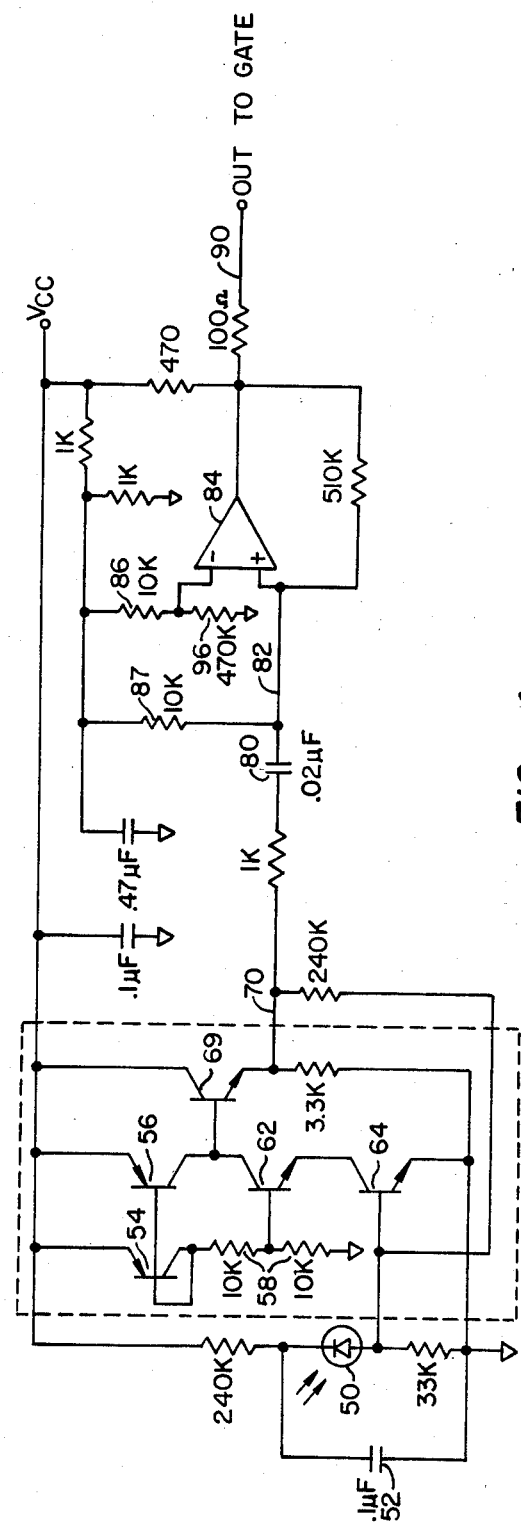
FIG._4.

LIGHT PEN HAVING ACTUATING ACCELEROMETER

BACKGROUND OF THE INVENTION

This invention relates to light pens and more particularly to a light pen actuated by an accelerometer.

Summary Of The Prior Art

Light pens are well known. For a summary of the prior art the reader is invited to see May, U.S. Pat. No. 4,454,417 column 1, line 7, through column 4, line 3.

Light pens commonly have relatively moving parts for actuating photoreceptors through various schemes of electrical channels. Examples of such patents include Jewitt et al., U.S. Pat. No. 3,498,692; Jones, U.S. Pat. No. 3,749,932; Radford, et al., U.S. Pat. No. 3,758,782; Takahashi et al., U.S. Pat. No. 4,263,592; and Brown, et al., U.S. Pat. No. 4,430,526.

Monostable electronic devices are known for holding open gates to receive signals from light pens. See Ablett, U.S. Pat. No. 3,801,741 and Giraud, U.S. Pat. No. 4,224,666.

SUMMARY OF THE INVENTION

A light pen of the type having a photoreceptor for sensing the signal from a CRT computer display and outputting to computer logic the location of the photosensing light pen is disclosed. The improvement herein is the incorporation of an accelerometer on the light pen actuated by tapping the pen gently on the screen. The accelerometer has the preferred form of a microphone acoustically deadened as by the placement of silicone rubber over the acoustical channel. The microphone and microphone diaphragm act as an accelerometer mass outputting a high frequency signal upon tapping of the light pen on the glass covering a CRT screen. A monostable amplifier opens a si9nal gate to conventional computer measuring logic for that duration necessary to assure one complete raster sweep of the screen. A light receptor at the screen end of the light pen outputs through a video amplifier and fast comparator to measure the precise moment of video raster passage. This light measurement is transmitted to conventional gate logic interior of the computer and compared to raster location, and converted into pen location.

Other Objects, Features And Advantages

An object of this invention is to disclose apparatus for actuating a light pen having no moving parts. According to this aspect of the invention, a light pen has the circuitry thereof incorporated on a circuit board and placed interiorly of the light pen. Attached rigidly to both the pen and circuit board is an accelerometer. The accelerometer is actuated when the light pen is gently tapped on a hard surface, such as the glass screen of a CRT monitor.

An advantage of the invention is that no moving parts are present. Moreover, by utilizing an accelerometer sensitive to tapping of the light pen, a precise and accurate actuating signal is generated.

A further advantage of this invention is that the light pen is actuated by a natural pen to paper action when placed on a screen. No unnatural reciprocation of the pen's moving parts results. Forces no more distinctive than that of placing a pen to paper are utilized in actuating the light pen of this invention. Consequently, user learned "pencil and paper" accuracies are easily adapted and used to assure accurate light pen location.

A further object of this invention is to disclose a preferred accelerometer. According to this aspect, a cheap capacitance type microphone has its acoustical diaphragm occluded and covered by silicone rubber. The microphone changes from an instrument sensitive to sound to an instrument sensitive to acceleration. The resultant cheap modification yields an accelerometer ideal for light pen actuation.

Yet another object of this invention is to disclose sensing circuitry usable with an accelerometer. According to this aspect of the invention, the light pen triggers a monostable circuit. The monostable circuit remains open for a sufficient period of time to assure one full raster scan. A photoreceptor at the end of the light pen detects the fast rise characteristic of the passage of a monitor raster. By gating the signals from the monostable amplifier and the fast comparator, pen location can be compared to raster location and the output of the located pen passed to conventional computer logic.

Other objects, features and advantages of this invention will be more apparent after referring to the following specification and attached drawings in which:

BRIEF DESCRIPTION OF THE DRAWINGS

FIG. 1 is a schematic of a light pen held to a CRT display screen and being tapped on the screen with portions of the pen broken away to show interiorly thereof the printed circuitry;

FIG. 2 is a microphone having silicone rubber;

FIG. 3 is a circuit schematic of the accelerometer and monostable circuit for permitting computer entry of a detected raster passage at the tip of the pen; and FIG. 4 is a circuit schematic of the photosensor, amplifier and comparator circuitry.

DESCRIPTION OF THE PREFERRED EMBODIMENTS

Referring to FIG. 1, a user at hand H is shown grasping a light pen P at or near the photoreceiving end of the light pen 14. The light pen is shown in the process of being used.

The user is tapping the pen at head 14 onto the screen S of a conventional computer display. For the convenience of the viewer, the pen is shown in partial section having a circuit board 16 rigidly mounted to pen sidewalls 18.

The reader will see that the circuit board 16 and pen sidewalls 18 are rigidly mounted together. No relative movement between any of the parts thereof occurs. Consequently, the pen has no relatively moving parts. The circuitry along circuit board 16 will be set forth hereafter, it will be ignored for the present.

Medially mounted of the circuit board and cylindrical in shape is the accelerometer of this invention.

Accelerometer 20 is shown more clearly in FIG. 2. It includes a condensor microphone. A condensor microphone Model U-63 manufactured under the trade name MURA or CORD by the Chaiyo Company of Taipei, Taiwan has been found suitable. Numerous other microphones will work as well.

Placed over the microphone to acoustically dampen the microphone and turn the microphone into an accelerometer is a silicone rubber mass. Typically, the silicone rubber is placed over the acoustical opening on the microphone and allow to cure. In the cured configuration, sound is not permitted to enter the microphone. Only the impact of acceleration reaches the actuating diaphragm of the microphone.

The reader should understand here that the microphone illustrated acting as an accelerometer is preferred. Other accelerometers will do as well. For example, prototypes of this invention have been manufactured using strain gauges attached to cantilevered masses. Other types of accelerometers will do.

The circuitry attached to the microphone will be explained with respect to FIG. 3 and the video amplification of light received from the CRT will be explained with respect to FIG. 4. Conventional downstream light pen electronics will be ignored, as they are known and do not form a part of this invention.

Referring to FIG. 3, microphone 20 outputs to the leg of amplifier 22 (an RCA 3240). The amplifier is provided with a feedback loop 23 and outputs to across a capacitor 24 to provide suitable edge differentiation of the accelerometer signal received. Across capacitor 24 the detected accelerometer signal passes to a monostable circuit having a 30 millisecond window.

The width of the signal detected by the accelerometer is on the order of 3 milliseconds. By having a 30 millisecond circuit developed at the monostable circuitry, at least one full sweep of the CRT screen by the raster will occur. Thus, after tapping to the screen, the pen will see raster passage.

The monostable circuit includes a biasing diode 26 and an amplifier 28 having a timing capacitor 30 for providing the 30 millisecond period. A quick recharge feedback loop includes a 1000 ohm resistor 33 and a diode 34. Resistor 38 buffers the input from the output and provides positive feedback for the multivibrator. Resistor 36, together with capacitor 30, determines output pulse width. These circuits are known. There results an amplified output 40 channeled to gates interior of a computer (not shown).

Light sensing of the circuit can be best understood with reference to FIG. 4. A photodiode 50 outputs a signal to a fast amplifier generically designated 60. Amplifier 60 is a device known as a Cascode input amplifier having paired end transistors 54, 56 closing across a leaking current through resistors 58. Upon closure, current normally flowing through the resistors 58 is mirrored and caused to flow through transistors 56, 62, 64. A signal out is at line 70 with transistor 69 added to provide a suitably low impedance.

Output occurs across a capacitor 80 which capacitor inputs to a leg 82 of comparator 84. A small amount of positive feedback is provided for to reduce chattering and provided hysteresis. The signal out at 90 passes to computer gating circuitry (again not shown).

Variable resistor 96 is a threshold adjustment. This resistor biases comparator 84 until a sufficiently large and upsetting signal overturns the bias and triggers the comparator to an opposite. Resistors 86 and 87 are input biasing resistors for the comparator.

The gating circuitry interior of the computer is conventional. Upon receiving simultaneous signals from the circuitry of FIG. 3 and the circuitry of FIG. 4, the instantaneous position of the raster is identified. Allowing for settling of the circuit, positional information of the light pen is extracted. Reading, writing, or reading and writing of the light pen to the display screen memory and/or to computer memory is effected.

The reader will understand that the disclose invention can admit of some modification. This is especially true with respect to the accelerometer which can include numerous embodiments including the preferred obstructed microphone herein utilized.

What is claimed is:

1. In the combination of a cathode ray tube display having a transparent screen, a raster for writing to said display and a light pen having a photosensor for detecting raster passage from the front of said cathode ray display and relaying raster passage to software logic interior of a computer; and a switch in combination with said light pen for gating a signal from said photosensor to circuitry for locating position of said photosensor in relation to said display, the improvement to said switch including an accelerometer mounted to said light pen actuated by the tapping of said light pen on the transparent screen of said CRT, said accelerometer including a mass movably mounted to said light pen and a transducer for detecting movement of said mass upon acceleration of said light pen upon tapping said light pen, and actuating said switch in response thereto.

2. The invention of claim 1 wherein said accelerometer comprises a condensor microphone covered with a silicone rubber mass.

3. A light pen in combination comprising:
   a cathode ray tube having a scanning raster;
   a pen having output to logic interior of a computer;
   a photoreceptor communicated to the tip of said pen;
   an accelerometer mounted to said pen for detecting tapping of said pen on a cathode ray tube, said accelerometer having an output, said accelerometer including a mass movably mounted to said light pen and a transducer for detecting movement of said mass upon acceleration of said light pen upon tapping said light pen, and actuating said switch in response thereto;
   a monostable circuit for outputting the output of said accelerometer for a time period sufficient for a complete raster sweep of said display; and
   a comparator connected to said photosensor for outputting to software logic interior of said computer the moment of raster passage at said light pen whereby a location of said light pen can be determined.

* * * * *